United States Patent
Heckl et al.

(10) Patent No.: US 12,130,136 B2
(45) Date of Patent: Oct. 29, 2024

(54) DUAL-COMB RANGING WITH LONG AMBIGUITY-FREE RANGE

(71) Applicant: Thorlabs, Inc., Newton, NJ (US)

(72) Inventors: Oliver Heckl, Vienna (AT); Jakob Fellinger, Arlberg (AT)

(73) Assignee: Thorlabs, Inc., Newton, NJ (US)

( * ) Notice: Subject to any disclaimer, the term of this patent is extended or adjusted under 35 U.S.C. 154(b) by 239 days.

(21) Appl. No.: 17/707,479

(22) Filed: Mar. 29, 2022

(65) Prior Publication Data

US 2022/0316855 A1 Oct. 6, 2022

Related U.S. Application Data

(60) Provisional application No. 63/168,632, filed on Mar. 31, 2021.

(51) Int. Cl.
| | |
|---|---|
| *G01S 17/34* | (2020.01) |
| *G01B 9/02001* | (2022.01) |
| *G01J 3/433* | (2006.01) |
| *G01J 3/45* | (2006.01) |
| *G01J 3/457* | (2006.01) |
| *G01S 7/48* | (2006.01) |
| *G01S 7/497* | (2006.01) |
| *G01S 17/894* | (2020.01) |
| *G01J 3/28* | (2006.01) |
| *G01J 3/42* | (2006.01) |

(52) U.S. Cl.
CPC ......... *G01B 9/02008* (2013.01); *G01J 3/433* (2013.01); *G01J 3/45* (2013.01); *G01J 3/457* (2013.01); *G01S 7/4808* (2013.01); *G01S 7/497* (2013.01); *G01S 17/34* (2020.01); *G01S 17/894* (2020.01); *G01J 2003/2879* (2013.01); *G01J 2003/423* (2013.01); *G01J 2003/4332* (2013.01)

(58) Field of Classification Search
CPC ............................ G01B 9/02008; G01S 17/34
See application file for complete search history.

(56) References Cited

U.S. PATENT DOCUMENTS 8,558,993 B2  10/2013  Newbury et al.

OTHER PUBLICATIONS

Zebin Zhu, "Synthetic-wavelength-based dual-comb interferometry for fast and precise absolute distance measurement", 2018 (Year: 2018).*
Siyu Zhou, "Simplified phase-stable dual-comb interferometer for short dynamic range distance measurement", Aug. 2019 (Year: 2019).*
Siyu Zhou, "Multi-pulse sampling dual-comb ranging method", 2020 (Year: 2020).*

(Continued)

*Primary Examiner* — Maurice C Smith
(74) *Attorney, Agent, or Firm* — Myers Wolin, LLC (57) ABSTRACT

A device that uses two intensity modulated frequency combs to measure distances with high precision and high data acquisition rate without any moving parts and without length ambiguity that is inherent conventional ranging based on two frequency combs. A modulation signal having a repetition rate identical to the repetition rate difference between the two combs is used to do a direct time-of-flight length measurement, hence avoiding the given length ambiguity while harvesting the increased precision of the dual-comb approach.

9 Claims, 7 Drawing Sheets

(56) References Cited

OTHER PUBLICATIONS

Alessio Gambetta, "Scanning micro-resonator direct comb absolute spectroscopy", Jun. 2016 (Year: 2016).*

Haosen Shi, "Timing Jitter of the Dual-Comb Mode-Locked Laser: A Quantum Origin and the Ultimate Effect on High-Speed Time- and Frequency-Domain Metrology", 2018 (Year: 2018).*

Jin, Jonghan, "Dimensional metrology using the optical comb of a mode-locked laser", Measurement Science and Technology, Dec. 31, 2015, pp. 1-17, vol. 27, IOP Publishing Ltd., United Kingdom.

Coddington I., et al., "Rapid and precise absolute distance measurements at long range", Nature Photonics, Jun. 2009, pp. 351-356, vol. 3, Macmillan Publishers Ltd.

Extended European Search Report with European search opinion issued by the European Patent Office for European Patent Application No. 22164927.0, mailed on Aug. 8, 2022.

Norman Bobroff, "Recent advances in displacement measuring interferometry", Measurement Science Technology, 1993, pp. 907-926, vol. 4.

Coddington et al., "Rapid and precise absolute distance measurements at long range", Nature Photonics, Jun. 2009 (published online May 24, 2009), pp. 351-356, vol. 3, Macmillan Publishers Limited.

Fellinger et al., "Tunable dual-comb from an all-polarization-maintaining single-cavity dual-color Yb:fiber laser", Optics Express, Sep. 30, 2019, pp. 28062-28074, vol. 27, No. 20.

Jang et al., "Distance Measurements Using Mode-Locked Lasers: A Review", Nanomanufacturing and Metrology, May 22, 2018, pp. 131-147, vol. 1, International Society for Nanomanufacturing and Tianjin University and Springer Nature.

Lee et al., Absolute distance measurement by dual-comb interferometry with adjustable synthetic wavelength , Measurement Science and Technology, Mar. 1, 2013, pp. 1-8, vol. 24, IOP Publishing Ltd.

Li et al., "High-precision long-distance measurement with an intensity-modulated frequency comb", Applied Optics, Aug. 20, 2020, pp. 7292-7298, vol. 59, No. 24, Optical Society of America.

Lin et al., "Dual-Comb Absolute Distance Measurement Based on a Dual-Wavelength Passively Mode-Locked Laser", IEEE Photonics Journal, Dec. 2017, pp. 1-9, vol. 9, No. 6, IEEE Photonics Society.

Link et al., "Dual-comb spectroscopy of water vapor with a free-running semiconductor disk laser", Science, Jun. 16, 2017, pp. 1164-1168, vol. 356.

Liu et al., "Sub-micron absolute distance measurements in sub-millisecond times with dual free-running femtosecond Er fiber-lasers", Optics Express, Sep. 12, 2011, pp. 18501-18509, vol. 19, No. 19, Optical Society of America.

Liu et al., "Fast distance measurement with a long ambiguity range using a free-running dual-comb fiber laser", Frontiers in Optics, Laser Science, 2020, pp. 1-2, Optical Society of America.

Minoshima et al., "High-accuracy measurement of 240-m distance in an optical tunnel by use of a compact femtosecond laser", Applied Optics, Oct. 20, 2000, pp. 5512-5517, vol. 39, No. 30.

Nathan R. Newbury, "Searching for applications with a fine-tooth comb", Nature Photonics, Apr. 2011, pp. 186-188, vol. 5, Macmillan Publishers Limited.

Shi et al., "Review of low timing jitter mode-locked fiber lasers and applications in dual-comb absolute distance measurement", Nanotechnology and Precision Engineering, 2018, pp. 205-217, vol. 1, KeAi Communications Co. Ltd.

Shi et al., "Effect of timing jitter on time-of-flight distance measurements using dual femtosecond lasers", Optics Express, Jun. 1, 2015, pp. 14057-14069, vol. 23, No. 11, Optical Society of America.

Tang et al., "Absolute distance measurement based on spectral interferometry using femtosecond optical frequency comb", Optics and Lasers in Engineering, Mar. 7, 2019, pp. 71-78, vol. 120, Elsevier Ltd.

Wu et al., "Synthetic wavelength interferometry of an optical frequency comb for absolute distance measurement", Scientific Reports, Mar. 12, 2018, pp. 1-7, vol. 8, No. 4362.

Xu et al., "Long distance measurement by dynamic optical frequency comb", Optics Express, Feb. 17, 2020, pp. 1398-4411, vol. 28, No. 4., Optical Society of America.

Zhang et al., "Compact Dual-Comb Absolute Distance Ranging With an Electric Reference", IEEE Photonics Journal, Jun. 2015, pp. 1-9, vol. 7, No. 3, IEEE Photonics Society.

Zhang et al., "Absolute distance measurement by dual-comb nonlinear asynchronous optical sampling", Optics Express, Mar. 24, 2014, pp. 6597-6604, vol. 22, No. 6, Optical Society of America.

Zhang et al., "Reliable non-ambiguity range extension with dual-comb simultaneous operation in absolute distance measurements", Measurement Science and Technology, Oct. 31, 2014, vol. 25, IOP Publishing Ltd, UK.

Zhou et al., "Simplified phase-stable dual-comb interferometer for short dynamic range distance measurement", Optics Express, Aug. 5, 2019, pp. 22868-22876, vol. 27, No. 16, Optical Society of America.

Zhu et al., "Two-color phase-stable dual-comb ranging without precise environmental sensing", Optics Express, Feb. 18, 2019, pp. 4660-4671, vol. 27, No. 4, Optical Society of America.

Zhu et al., "Dual-Comb Ranging", Engineering, Oct. 26, 2018, pp. 772-778, vol. 4, Elsevier Ltd.

* cited by examiner

DUAL-COMB RANGING WITH LONG AMBIGUITY-FREE RANGE

CROSS REFERENCE TO RELATED APPLICATIONS

This application claims the benefit of U.S. Provisional Patent Application No. 63/168,632 filed on Mar. 31, 2021. The disclosure of U.S. Provisional Patent Application 63/168,632 is hereby incorporated by reference.

FIELD OF THE INVENTION

The invention generally relates to measurement systems. More particularly, the invention relates to a device that uses two modulated optical frequency combs to measure distances with high precision and high data acquisition rate without any moving parts and with a length ambiguity which is not given any more by the repetition rate of the frequency combs but by the modulation frequency.

BACKGROUND

Figure 1:
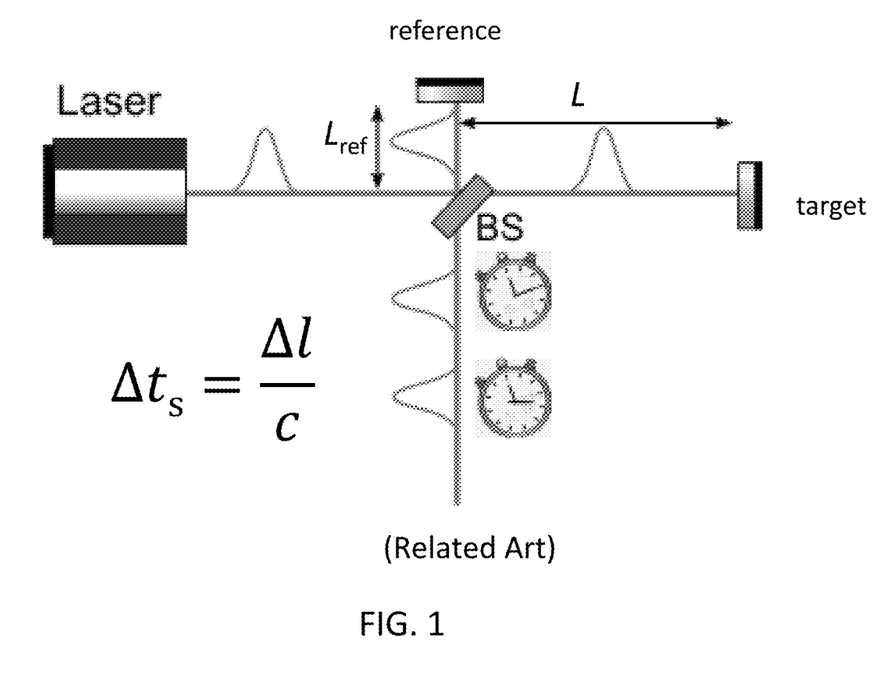
FIG. 1 illustrates the principle of time-of-flight measurement.

Established ranging technologies are mostly based on time-of-flight measurements, where a laser is sent to a target and its travel-time is measured. FIG. 1 illustrates the principle of a time-of-flight measurement. In FIG. 1, a laser having an intensity modulated profile is transmitted to a target and a reference. The reflected signals from the target and the reference are detected. The time shift between the intensity profiles of the detected target and reference signals provides the difference in time of flight. Since the distance to the reference $L_{ref}$ is known, the distance to the target L can be determined based on a time difference between the intensity profiles of the detected target and reference signals. Here, the minimum length resolution is given by the photodetector's temporal resolution (several ps) corresponding to a minimum length resolution on the mm-scale. In this kind of measurements, fast photodiode detectors are needed. However, these detectors lack the resolution required by many high precision ranging applications.

Systems and methods for determining the absolute distance from an object are very important in applications such as large-scale construction, long-distance engineering, spacing and military operations, etc. In particular, ranging based on two frequency combs has been a hot topic in science and engineering (Coddington, Swann, Nenadovic, & Newbury, 2009). The precision of the dual-comb-ranging approach compared to the established time-of-flight techniques scales with $f_{rep,2}/\Delta f_{rep}$. Here, $f_{rep,2}$ is the repetition rate of the comb used for the distance measurement and $\Delta f_{rep}$ being the difference in repetition rates between both combs ($f_{rep1}$, $f_{rep2}$).

Figure 2:
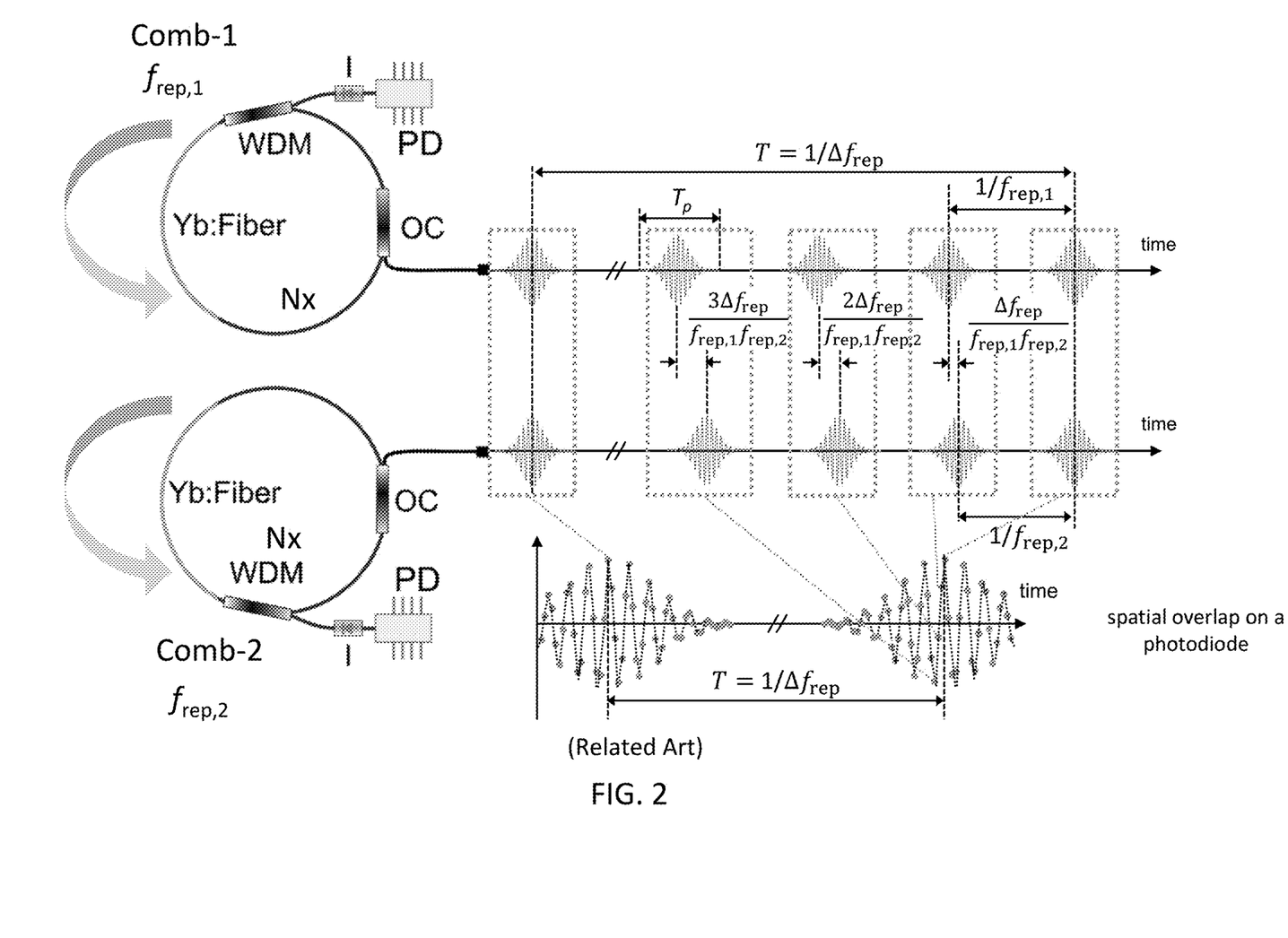
FIG. 2 illustrates the principle of dual-comb and the generation of interferograms.

In the dual-comb-ranging approach, one comb is sent to a target and a reference, the return signals are combined with the other comb. The beating of the two generates two shifted interferograms, a target interferogram and a reference interferogram. FIG. 2 illustrates the principle of the dual-comb and the generation of interferograms. As can be seen in FIG. 2, comb-1 has a repetition rate $f_{rep,1}$ and comb-2 has a repetition rate $f_{rep,2}$, and $\Delta f_{rep}$ is the difference in repetition rates between both comb-1 and comb-2. Because of the difference in repetition rates, the pulses of two combs shift from each other until a time $T=1/\Delta f_{rep}$ when the pulses of two combs coincide again. The spatial overlap of the two combs manifests in an optical beating which can be measured as interferograms using a photodiode detector. If comb-1 is used for sampling and comb-2 is used for measurement, the time difference between the target interferogram and reference interferogram can be used for a very accurate distance measurement.

Figure 3:
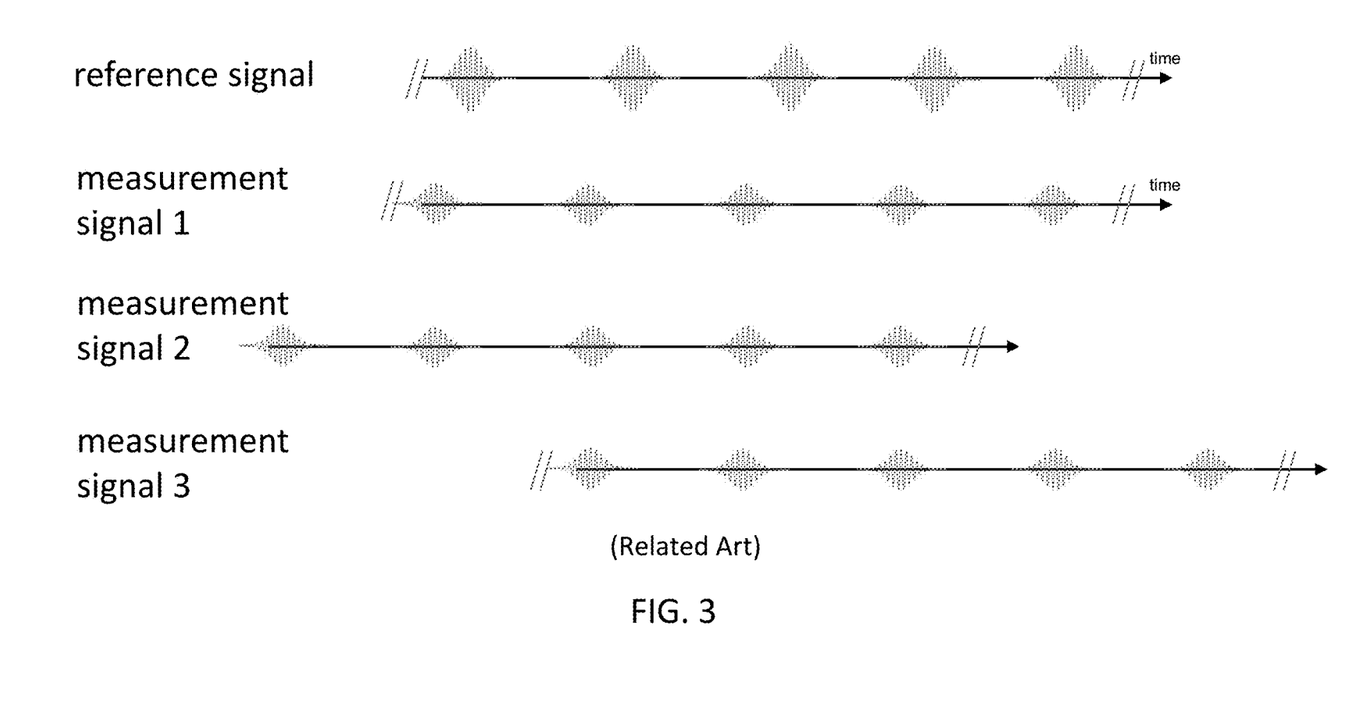
FIG. 3 illustrates a length ambiguity in the measurement in the dual-comb-ranging method.

However, this high precision comes at the price of using two phase-stable frequency combs and leads to a length ambiguity in the measurement. Only lengths up to the length of $c/f_{rep,2}$ can be measured unambiguously in a single measurement, as illustrated in FIG. 3. As can be seen in FIG. 3, measurement signal 2 is shifted backward by exactly one repetition period from measurement signal 1 and measurement signal 3 is shifted forward by exactly one repetition period from measurement signal 1. Therefore, three difference measurement signals would produce the same result. Hence, only lengths up to the length of $c/f_{rep,2}$ can be measured unambiguously in a single measurement.

Standard distance-measurement methods, such as homodyne or heterodyne methods, are based on a continuous wavelength (CW) laser evaluated by accumulating the interferometric phase to achieve a high precision (Bobroff, 1993). These methods need continuous monitoring of the interferometric phase; any disturbance renders these methods useless.

In addition, there are frequency-comb based measurement methods. The idea to use two optical frequency combs in ranging applications to increase measurement accuracy is not new. Still, practical applications have mostly been hindered by experimental complexity and the availability of environmentally stable optical frequency combs (Newbury, 2011). There has been a vast amount of work in this field in previous years (Lee et al., 2013; Li et al., 2020; Lin et al., 2017; T. -A. Liu, Newbury, & Coddington, 2011; Shi et al., 2018; Wu et al., 2018; Hongyuan Zhang, Wei, Wu, Yang, & Li, 2014a, 2014b; Zhou, Xiong, Zhu, & Wu, 2019; Zhu, Ni, Zhou, & Wu, 2019). Common challenges are still the above-mentioned ambiguity range enforcing two separate measurements (Vernier effect) and/or in most cases the necessity to have to provide two phase-stable lasers and/or relying on a highly reflecting target providing a substantial number of reflected photons to measure weak sidebands or create the measurement signal via second-harmonic generation.

Therefore, in view of the above noted challenges, there is a long-felt need for a distance measurement system and method that uses two frequency combs to measure distances (up to several hundred km) with high accuracy (few tens of μm) and high data acquisition rate (greater 100 Hz) without any moving parts and with extended length ambiguity that is inherent conventional ranging based on two frequency combs.

SUMMARY

To overcome the aforementioned challenges, one embodiment proposes to use a single-cavity dual-comb (Fellinger et al., 2019) to avoid the need for a phase-stable link between two separate frequency combs. Furthermore, the pulse train of the single-cavity dual-comb comprises a modulation signal caused by intra-cavity pulse collisions. This modulation signal has a repetition rate of $\Delta f_{rep}$, identical to the repetition rate difference between the two combs. An embodiment uses this modulation signal to do a direct time-of-flight length measurement, hence avoiding the given length ambiguity while harvesting the increased precision of the dual-comb approach.

An embodiment of the present invention enables measurements with high accuracy and at a high repetition rate at a potentially low cost due to a minimum of necessary active stabilization. For an automotive sensor, preliminary results show that an embodiment can measure speed differences of 0.02 m/s with 200 Hz corresponding to a measurement every 5 msec. It is contemplated that some embodiments may operate various wavelengths, most notably the eye-safe telecom wavelength of around 1.5 μm. Performance of the systems according to various embodiments of the present invention can easily be improved by optimizing some of the system operation parameters.

One embodiment of the present invention provides a distance measurement device including: one or more laser sources configured to generate a dual-comb pulse train, the dual-comb pulse train including a first comb having a first repetition rate and a second comb having a second repetition rate different from the first repetition rate, and an intensity of the individual pulse trains being modulated by a modulation signal having a modulation frequency equal to a difference between the first repetition rate and the second repetition rate; optical elements configured to transmit the second comb to a target and to a reference, and to receive a reflected target signal from the target and a reflected reference signal from the reference; one or more detectors configured to detect the reflected target signal sampled by the first comb to create a target interferogram, and to detect the reflected reference signal sampled by the first comb to create a reference interferogram, and to detect the reflected target signal and the reflected reference signal; and a processor configured to determine a time of flight between the target and the reference based on a time difference between the intensity modulation of the target signal and the intensity modulation of the reference signal, and to determine a distance between the target and the reference based on a time difference between the target interferogram and the reference interferogram detected and on the determined the time of flight.

One embodiment of the present invention provides a method of distance measurement including: generating a dual-comb pulse train, the dual-comb pulse train including a first comb having a first repetition rate and a second comb having a second repetition rate different from the first repetition rate, and an intensity of the individual pulse trains being modulated by a modulation signal having a modulation frequency equal to a difference between the first repetition rate and the second repetition rate; transmitting the second comb to a target and to a reference; receiving a reflected target signal from the target and a reflected reference signal from the reference; sampling the reflected target signal by the first comb to create a target interferogram; sampling the reflected reference signal by the first comb to create a reference interferogram; determining a time of flight between the target and the reference based on a time difference between the intensity modulation of the reflected target signal and the intensity modulation of the reflect reference signal; and determining a distance between the target and the reference based on a time difference between the target interferogram and the reference interferogram and on the determined the time of flight.

DETAILED DESCRIPTION OF THE PREFERRED EMBODIMENTS

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

An embodiment of the present invention offers the advantage of a combination of time-of-flight measurement and classic dual-comb ranging measurement based on a single laser source. In one embodiment, the dual-comb is based on a single cavity light source. The modulation is created by an intra-cavity pulse collision between the two combs. The single cavity approach offers the advantage of common-mode noise cancellation; hence, no phase locking of the two combs to each other is needed. The unique combination of time-of-flight and dual-comb measurements offers ambiguity-free length measurements up to a range of $c/\Delta f_{rep}$ with a measurement-speed in the ms range.

Figure 4:
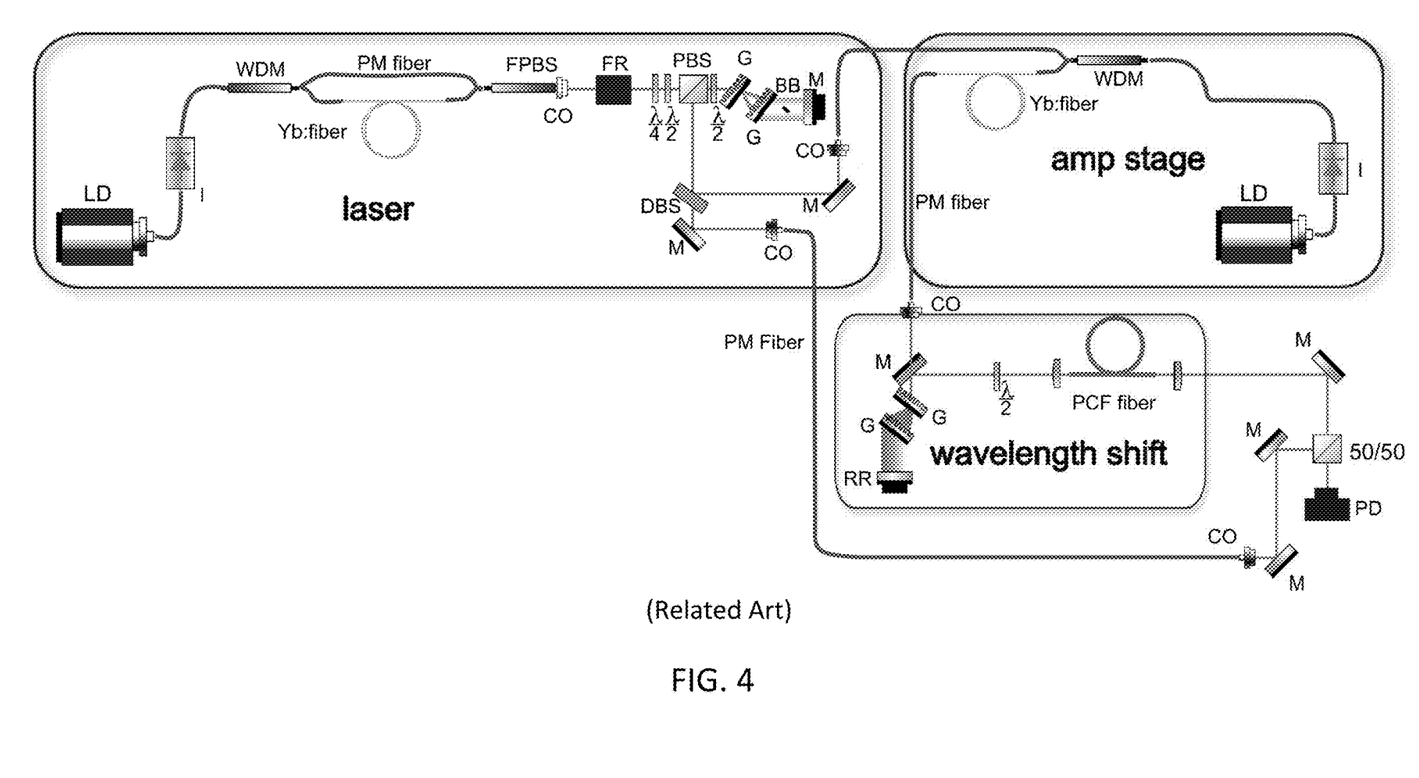
FIG. 4 shows a schematic diagram of a single-cavity dual-comb laser source.

FIG. 4 shows an example embodiment in which a single-cavity dual-color laser is used as the dual-comb source according to one embodiment. It is understood that other implementations the dual-comb sources are also contemplated, for example, a single cavity dual comb source based on polarization multiplexing, bi-directional laser operation, dual wavelength operation, or branching optical paths by birefringence, etc.

Figure 5:
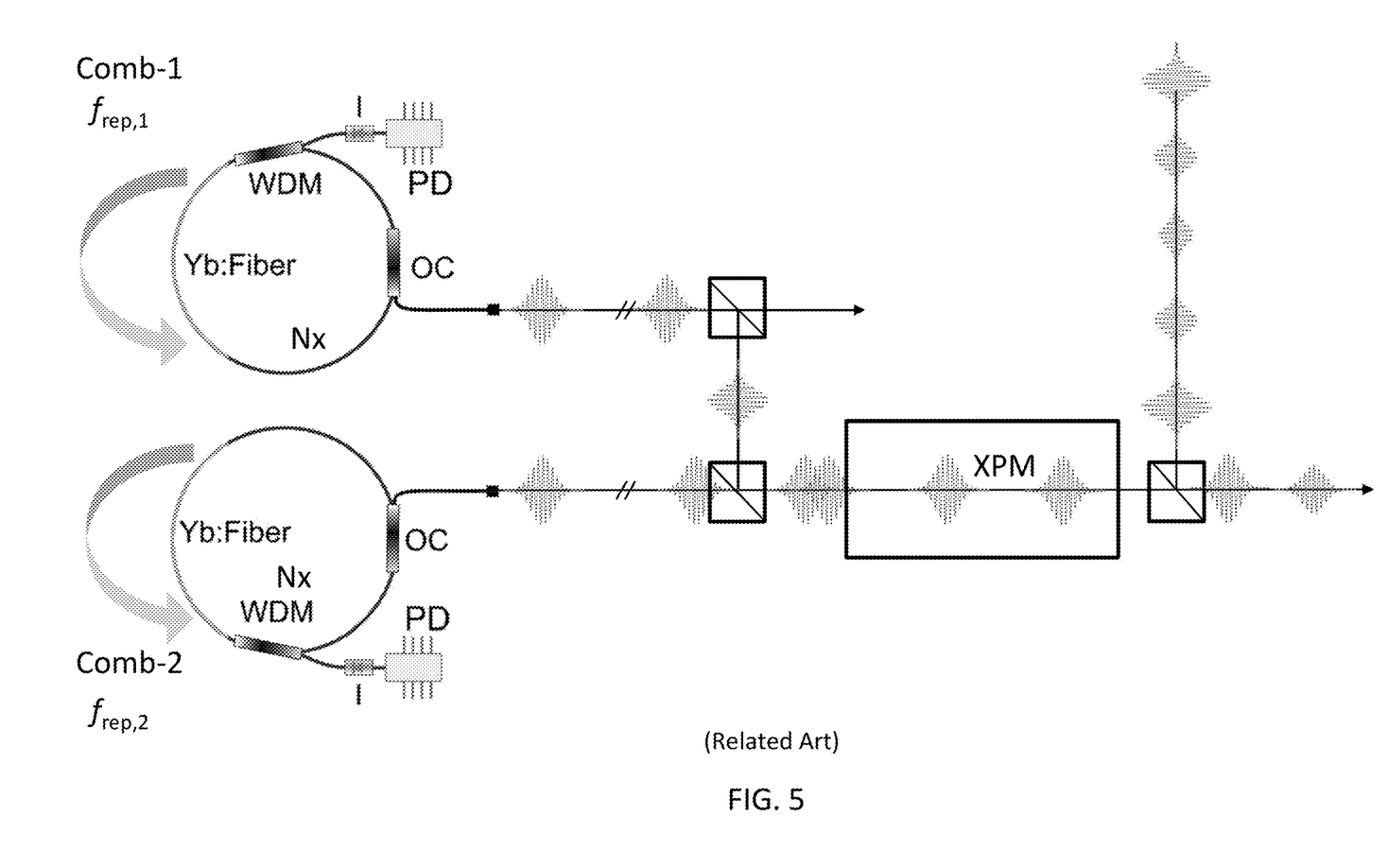
FIG. 5 illustrates an intensity modulation of two combs from two laser sources.

In another embodiment, the dual-comb is based on two laser sources, each generating a frequency comb, and the intensity modulation is created by overlapping pulses from both combs in a nonlinear medium, such as a group including fiber optical waveguide, semiconductor waveguide, optical crystal, glass, nonlinear surface, or other cross-phase modulation devices. FIG. 5 shows an example embodiment in which two separate lasers are used as the dual-comb sources according to one embodiment. The intensity modulation occurs when the two combs interact, for example, in a cross-phase modulation medium or device.

Other dual-comb ranging approaches without this modulation signal rely on the Vernier-effect to increase their ambiguity-free range. To resolve the ambiguity in length measurements, they need to switch the role of the signal and reference path, which either increases the measurement time and introduces moving parts (Coddington et al., 2009) or they need to introduce additional (power dependent and power-hungry) nonlinear optics to enable a simultaneous measurement (H Zhang, Wu, Wei, & Li, 2015). This increases the measurement time or (and) introduces moving parts.

An alternative high-precision ranging method relies on using a single frequency comb and an EOM (Li et al., 2020). This method offers high-precision and long-distance measurement but depends on the measurement of weak sidebands, which will place high requirements on the reflectivity of the target. This might render it unsuitable for usage outside a laboratory environment.

According to an embodiment, the aforementioned single-cavity dual-comb laser (Fellinger et al., 2019) is used to perform a time-of-flight measurement and dual-comb ranging. A single-cavity laser is configured to generate a dual-comb pulse train output. The dual-comb pulse train includes a first frequency comb having a first repetition rate ($f_{rep,1}$) and a second frequency comb having a second repetition rate ($f_{rep,2}$). When running in dual-comb operation, this laser produces two mutually coherent optical frequency combs and a periodically appearing modulation signal with the frequency $\Delta f_{rep}$.

Figure 6:
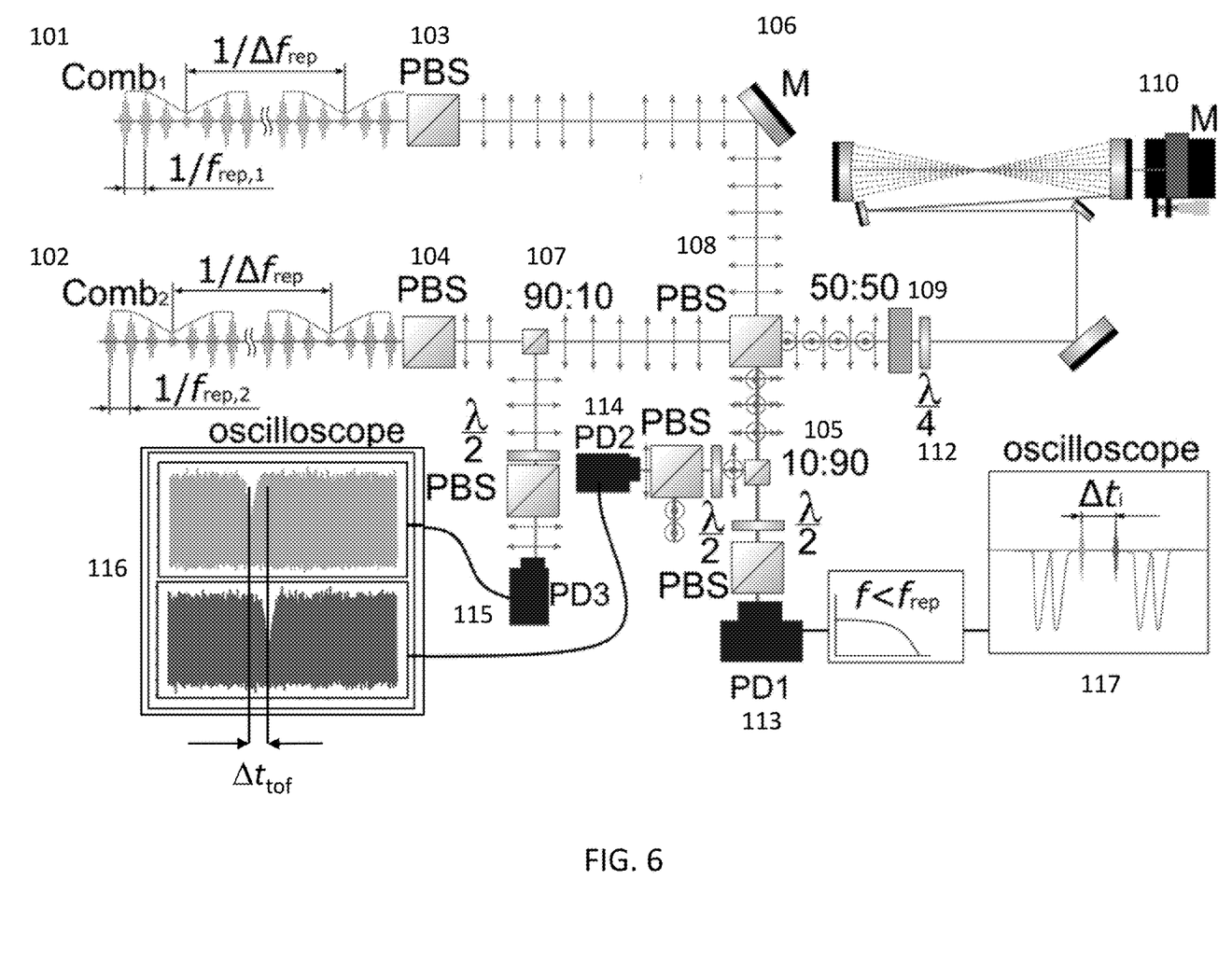
FIG. 6 shows a schematic diagram of a dual-comb ranging system according to an embodiment of the present invention.

An improved technique according to an embodiment is the use of two frequency combs as shown in FIG. 6, which illustrates the working principle of dual-comb ranging based on two phase-stable optical frequency combs. Comb 1 is used to sample comb 2 and provides the reference on photodiode 1 (PD1). Photodiode 2 (PD2) provides the actual measurement signals. The time delay $\Delta t_c$ is used for the coarse length measurement and the time-delay $\Delta t_i$ between the interferograms is used for precise dual-comb ranging.

Here, one comb (comb 1 in FIG. 6) is used to sample the other comb (comb 2 in FIG. 6). Comb 2 is used to measure the distance L. The precision of a dual-comb ranging approach compared to the established time-of-flight techniques scales with $f_{rep}/\Delta f_{rep}$, with $f_{rep}$ being the repetition rate of the comb used for the actual ranging ($f_{rep,2}$ in FIG. 6) and $\Delta f_{rep}$ being the difference in $f_{rep}$ between comb 1 and comb 2. This high precision corresponds with a length ambiguity in the measurement. Only lengths up to the length of $c/f_{rep,2}$ can be measured unambiguously.

In an example implementation shown in FIG. 6, the first and second frequency combs 101, 102 are spatially separated by one or more optical elements (not shown), and each comb passes through a respective polarization beam splitter (PBS) 103, 104. After the PBS 103, the first comb 101 is reflected by a mirror 106 to a beam splitter 108, and then to the photodetector 113. The first comb is used for sampling the returned target signal for generation of a target interferogram, and for sampling the returned reference signal for generation of a reference interferogram.

After the PBS 104, the second comb 102 passes through a beam splitter 107 and then the PBS 108. Then, the second comb 102 is transmitted to a reference 109 and a target 110. A quarter-wave plate 112 is inserted into the path to the target. Note that FIG. 6 illustrates how the target distance may be extended in an experimental setting.

Return signals from the reference and target are reflected by the PBS 108 into the photodetector 113, and together with the first comb, produce a target interferogram and a reference interferogram. A portion of the return signal from the target is reflected by a beam splitter 105 into a photodetector 114, and a portion of the return signal from the reference is reflected by the beam splitter 107 into a photodetector 115. Photodetectors 114 and 115 are calibrated to account for a slight difference in the path length to the reference arm. The calibration is easily implemented by sending a reference beam to both photodetectors, for example. As illustrated in the oscilloscope output 116, the time of flight $\Delta t_{tof}$ can be obtained from the time shift between the intensity profiles of the reflected signals from the target and reference. Note that the time of flight based on the time difference between the intensity modulation of the target signal and the intensity modulation of the reference signal provides an ambiguity free measurement range greater than $c/f_{rep}$, and in the present case, the ambiguity free measurement range is $c/\Delta f_{rep}$. As shown in the oscilloscope output 117, the target distance can be accurately obtained based on the time difference between the reference interferogram and the signal interferogram, together the ambiguity free measurement range determined by the time-of-flight measurement of the intensity modulation. Note that the optical elements and their arrangement shown in FIG. 6 are just one example implementation. It is contemplated that a skilled person may modify the arrangement shown in FIG. 6 with an alternate arrangement having same, more, fewer and/or different optical elements for the delivery of the optical signals without deviating from the operation principle according to an embodiment of the present invention.

Figure 7:
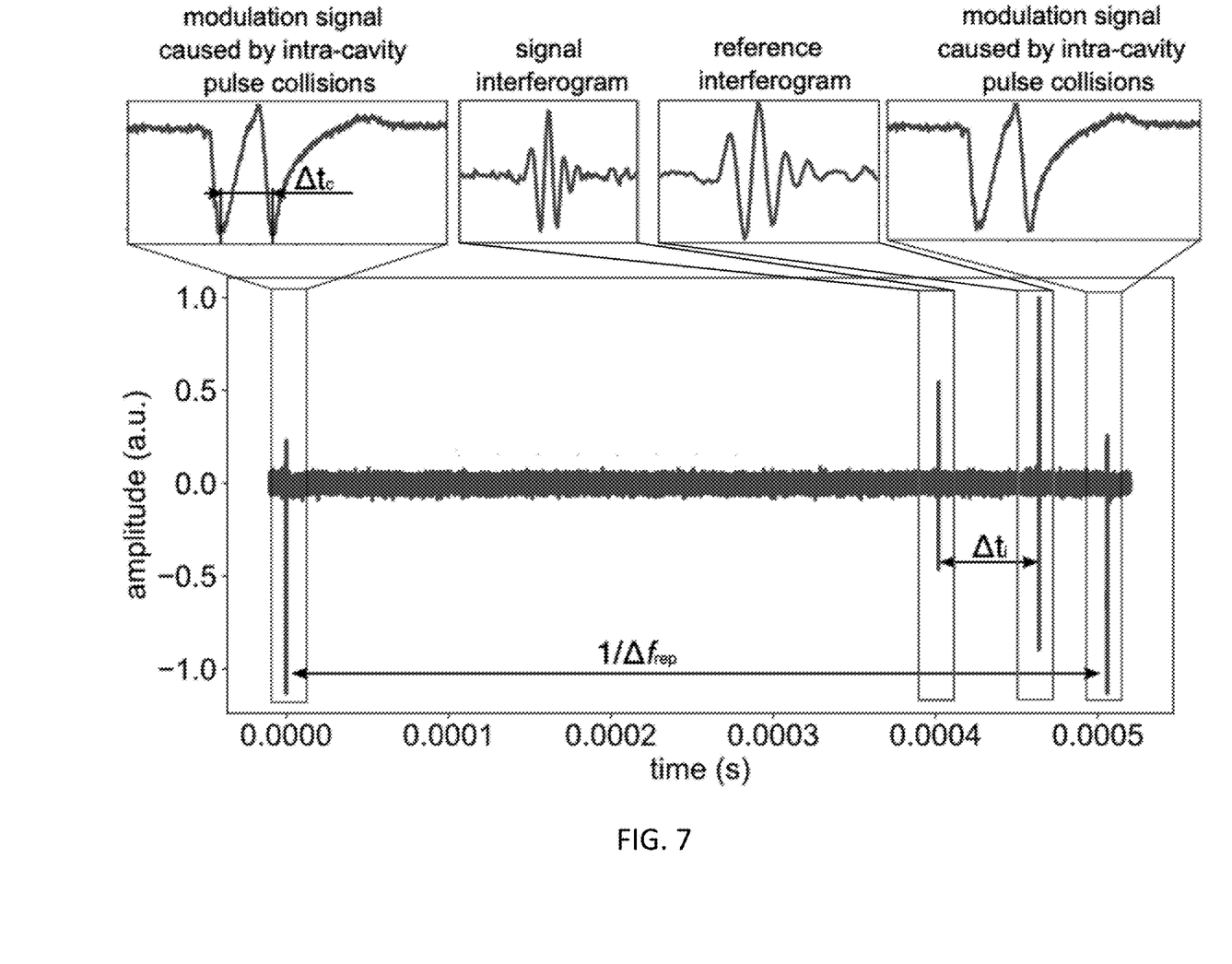
FIG. 7 shows a length measurement signal obtained from a dual-comb ranging system according to an embodiment of the present invention.

An exemplary measurement can be seen in FIG. 7. The time-delay $\Delta t_c$ of the modulation signal is used for coarse length calculation and the time-delay $\Delta t_i$ between the interferograms is used for precise dual-comb ranging. The measurement shows a complete scan of $1/\Delta f_{rep}$, corresponding to the minimum measurement time.

The time delay between Ate between the two modulation signals is used to measure the distance with low resolution and the time delay $\Delta t_i$ between the reference interferogram and the sampling interferogram gives the high-precision length measurement.

According to one embodiment, the two optical frequency combs are used for high-precision ranging (resolution on the 100 µm scale or better) and the inherent modulation signal at $\Delta f_{rep}$ for a time-of-flight measurement is used to increase the ambiguity range to $c/\Delta f_{rep}$. In the present example implementation, $c/\Delta f_{rep}$ is on the order of several hundred kilometers. An approach according to an embodiment is unique in that it offers the high precision of dual-comb ranging and does not rely on two separate measurement runs (Coddington et al., 2009), it does not rely on a substantial amount of returned power ((Li et al., 2020)) and does not need two separate light sources for frequency comb generation.

An embodiment of the present invention has many advantages over the existing systems. For example, the ambiguity range is increased to >100 km compared to the meter-scale in existing system; it uses only one single laser with little stabilization ($f_{rep,2}$ needs to be either stabilized or continuously measured) instead of two mutually phase stable (locked) frequency combs; it could be combined with other single-cavity dual-comb approaches such as the potentially cheap to produce dual-comb MIXELs (Link, Maas, Waldburger, & Keller, 2017); and it does not need many reflected photons returning to the sensor, µW-level of reflected power is sufficient in our experiments.

There are multiple implementations according to embodiments of the present invention for a free running or stabilized dual optical frequency comb of moderate repetition rate stability with modulation period=$1/\Delta f_{rep}$, and the intensity modulation is used for time-of-flight (TOF) ranging, and the dual combs then used for high precision ranging (DC-ranging). Possible implementations include: EO-combs, micro resonators with periodic mode structure, mode-locked lasers in either fiber, bulk, or semiconductor, intensity modulation can be created by overlapping pulses from both combs in a non-linear medium such as optical waveguides (fiber or semiconductor), optical crystal, glass, nonlinear surface, intensity modulation can be created by active optical devices such as EOMs or AOMs, and intensity modulation can be mutual (two-sided) or one-sided. In one embodiment, the intensity modulation signal is periodic. The periodic intensity modulation can be used to track $\Delta f_{rep}$ and calibrate dual-comb-ranging.

Note that the single cavity dual comb as described above can be implemented with intracavity passive intensity modulation (e.g., via nonlinear effects within the cavity), or with intracavity actively modulated (e.g., via EOM, AOM, or other similar modulators) intensity modulation with a frequency of $\Delta f_{rep}$.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

REFERENCES

[1] Bobroff, N. (1993). Recent advances in displacement measuring interferometry. Measurement Science and Technology, 4(9), 907-926.

[2] Coddington, I., Swann, W. C., Nenadovic, L., & Newbury, N. R. (2009). Rapid and precise absolute distance measurements at long range. Nature Photonics, 3(6), 351-356.

[3] Fellinger, J., Mayer, A. S., Winkler, G., Grosinger, W., Truong, G. -W., Droste, S., . . . Heckl, O. H. (2019). Tunable dual-comb from an all-polarization-maintaining single-cavity dual-color Yb:fiber laser. Optics Express, 27(20), 28062.

[4] Jang, Y. -S., & Kim, S. -W. (2018). Distance Measurements Using Mode-Locked Lasers: A Review. Nanomanufacturing and Metrology, 1(3), 131-147.

[5] Lee, J., Han, S., Lee, K., Bae, E., Kim, S., Lee, S., . . . Kim, Y. -J. (2013). Absolute distance measurement by dual-comb interferometry with adjustable synthetic wavelength. Measurement Science and Technology, 24(4), 045201.

[6] Li, G., Fang, Y., Zhang, H., Sun, J., Liu, Z., Song, T., . . . Wang, Y. (2020). High-precision long-distance measurement with an intensity-modulated frequency comb. Applied Optics, 59(24), 7292.

[7] Lin, B., Zhao, X., He, M., Pan, Y., Chen, J., Cao, S., . . . Fang, Z. (2017). Dual-Comb Absolute Distance Measurement Based on a Dual-Wavelength Passively Mode-Locked Laser. IEEE Photonics Journal, 9(6), 1-8.

[8] Link, S. M., Maas, D. J. H. C., Waldburger, D., & Keller, U. (2017). Dual-comb spectroscopy of water vapor with a free-running semiconductor disk laser. Science, 356 (6343), 1164-1168.

[9] Liu, T. -A., Newbury, N. R., & Coddington, I. (2011). Sub-micron absolute distance measurements in sub-millisecond times with dual free-running femtosecond Er fiber-lasers. Optics Express, 19(19), 18501.

[10] Liu, Y., Zhu, Z., Yang, J., & Hu, G. (2020). Fast distance measurement with a long ambiguity range using a free-running dual-comb fiber laser, 3-4.

[11] Minoshima, K., & Matsumoto, H. (2000). High-accuracy measurement of 240-m distance in an optical tunnel by use of a compact femtosecond laser. Applied Optics, 39(30), 5512-5517.

[12] Newbury, N. R. (2011). Searching for applications with a fine-tooth comb. Nature Photonics, 5(4), 186-188.

[13] Shi, H., Song, Y., Li, R., Li, Y., Cao, H., Tian, H., . . . Hu, M. (2018). Review of low timing jitter mode-locked fiber lasers and applications in dual-comb absolute distance measurement. Nanotechnology and Precision Engineering, 1(4), 205-217.

[14] Shi, H., Song, Y., Liang, F., Xu, L., Hu, M., & Wang, C. (2015). Effect of timing jitter on time-of-flight distance measurements using dual femtosecond lasers. Optics Express, 23(11), 14057-14069.

[15] Tang, G., Qu, X., Zhang, F., Zhao, X., & Peng, B. (2019). Absolute distance measurement based on spectral interferometry using femtosecond optical frequency comb. Optics and Lasers in Engineering, 120,71-78.

[16] Wu, G., Liao, L., Xiong, S., Li, G., Cai, Z., & Zhu, Z. (2018). Synthetic wavelength interferometry of an optical frequency comb for absolute distance measurement. Scientific Reports, 8(1), 4362.

[17] Xu, X., Zhang, Z., Zhang, H., Zhao, H., Xia, W., He, M., . . . Wu, H. (2020). Long distance measurement by dynamic optical frequency comb. Optics Express, 28(4), 4398-4411.

[18] Zhang, H, Wu, X., Wei, H., & Li, Y. (2015). Compact Dual-Comb Absolute Distance Ranging With an Electric Reference. IEEE Photonics Journal, 7(3), 1-8.

[19] Zhang, Hongyuan, Wei, H., Wu, X., Yang, H., & Li, Y. (2014a). Absolute distance measurement by dual-comb nonlinear asynchronous optical sampling. Optics Express, 22(6), 6597.

[20] Zhang, Hongyuan, Wei, H., Wu, X., Yang, H., & Li, Y. (2014b). Reliable non-ambiguity range extension with dual-comb simultaneous operation in absolute distance measurements. Measurement Science and Technology, 25(12), 125201.

[21] Zhou, S., Xiong, S., Zhu, Z., & Wu, G. (2019). Simplified phase-stable dual-comb interferometer for short dynamic range distance measurement. Optics Express, 27(16), 22868.

[22] Zhu, Z., Ni, K., Zhou, Q., & Wu, G. (2019). Two-color phase-stable dual-comb ranging without precise environmental sensing. Optics Express, 27(4), 4660.

[23] Zhu, Z., & Wu, G. (2018). Dual-Comb Ranging. Engineering, 4(6), 772-778.

What is claimed is:

1. A distance measurement device comprising:
one or more laser sources configured to generate a dual-comb pulse train, the dual-comb pulse train comprising a first comb having a first repetition rate and a second comb having a second repetition rate different from the first repetition rate, and an intensity of the individual pulse trains being modulated by a modulation signal having a modulation frequency equal to a difference between the first repetition rate and the second repetition rate;
optical elements configured to transmit the second comb to a target and to a reference, and to receive and direct a reflected target signal from the target and a reflected reference signal from the reference;
one or more detectors configured to detect the reflected target signal sampled by the first comb to create a target interferogram, and to detect the reflected reference signal sampled by the first comb to create a reference interferogram, and to detect the reflected target signal and the reflected reference signal; and
a processor configured to determine a time of flight between the target and the reference based on a time difference between the intensity modulation of the target signal and the intensity modulation of the reference signal, and to determine a distance between the target and the reference based on a time difference between the target interferogram and the reference interferogram detected and on the determined the time of flight;
wherein the intensity modulation is periodic, and the periodic intensity modulation is used to track the difference between the first and second repetition rates and to calibrate the distance measurement.

2. The device of claim 1, wherein the one or more laser sources is configured to generate the dual-comb by electro-optic phase modulation.

3. The device of claim 1, wherein the one or more laser sources comprises micro resonators with periodic mode structure.

4. The device of claim 1, wherein the one or more laser sources comprises a mode-locked laser in fiber, bulk, or semiconductor.

5. The device of claim 1, wherein the intensity modulation is created by overlapping pulses from both combs in a nonlinear medium, the nonlinear medium being selected from a group comprising fiber optical waveguide, semiconductor waveguide, optical crystal, glass and nonlinear surface.

6. The device of claim 1, wherein the intensity modulation is created by an active optical device, and the active optical device being an electro-optic modulator (EOM) or acousto-optic modulator (AOM).

7. The device of claim 1, wherein the intensity modulation is two-sided or one-sided.

8. The device of claim 1, wherein the one or more laser sources comprises a single-cavity dual-comb laser based on polarization multiplexing, bi-directional laser operation, dual wavelength operation, or branching optical paths by birefringence.

9. A method of distance measurement comprising:
generating a dual-comb pulse train, the dual-comb pulse train comprising a first comb having a first repetition rate and a second comb having a second repetition rate different from the first repetition rate, and an intensity of the individual pulse trains being modulated by a modulation signal having a modulation frequency equal to a difference between the first repetition rate and the second repetition rate;
transmitting the second comb to a target and to a reference;
receiving and directing a reflected target signal from the target and a reflected reference signal from the reference;
sampling the reflected target signal by the first comb to create a target interferogram;
sampling the reflected reference signal by the first comb to create a reference interferogram;
determining a time of flight between the target and the reference based on a time difference between the intensity modulation of the reflected target signal and the intensity modulation of the reflect reference signal; and
determining a distance between the target and the reference based on a time difference between the target interferogram and the reference interferogram and on the determined the time of flight;
wherein the intensity modulation is periodic, and the periodic intensity modulation is used to track the difference between the first and second repetition rates and to calibrate the distance measurement.

* * * * *